United States Patent
Wu

(10) Patent No.: US 8,229,295 B2
(45) Date of Patent: Jul. 24, 2012

(54) PORTABLE ELECTRONIC DEVICE

(75) Inventor: Cheng-Shiun Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/965,905

(22) Filed: Dec. 12, 2010

(65) Prior Publication Data

US 2012/0076487 A1    Mar. 29, 2012

(30) Foreign Application Priority Data

Sep. 29, 2010   (TW) ................................. 99133169 A

(51) Int. Cl.
*G03B 17/00* (2006.01)
*H04N 5/225* (2006.01)
*G02B 7/02* (2006.01)

(52) U.S. Cl. ......... 396/533; 348/375; 348/376; 359/829

(58) Field of Classification Search ................. 396/533, 396/529; 348/340, 373, 375, 376; 359/829
See application file for complete search history.

(56) References Cited

U.S. PATENT DOCUMENTS

2007/0280677 A1* 12/2007 Drake et al. ................. 396/429
* cited by examiner

*Primary Examiner* — Rochelle-Ann J Blackman
(74) *Attorney, Agent, or Firm* — Altis Law Group, Inc.

(57) ABSTRACT

A portable electronic device includes a case, a camera lens module, and a support. The case has a lens hole. The camera lens is received in the case and corresponding to the lens hole. The lens hole has a first connection portion. The first connection portion is engaged with a second connection portion of an external device accessory. Therefore, the external device accessory can be configured on the case and work with the camera lens module. The support is connected to the case, and positioned on the periphery of the lens hole. The support is configured for supporting the external device accessory on the case.

20 Claims, 3 Drawing Sheets

PORTABLE ELECTRONIC DEVICE

BACKGROUND

1. Technical Field

The disclosure relates to portable electronic devices, and particularly to a portable electronic device providing external connection of an accessory.

2. Description of the Related Art

Portable electronic devices, such as mobile phones, personal digital assistants (PDA), or MP3 players, are in common use, and offer numerous supplementary functions, such as an image capture function. However, since most portable electronic devices prioritize minimal volume and weight, a camera module for the portable electronic devices typically only have a fixed focal length. Image capture using a variety of lenses, such as wide-angle and other lenses is not an available function, limiting the scope of the portable electronic device.

Therefore, it is desirable to provide a portable electronic device which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present portable electronic device. Moreover, in the drawings, like reference numerals designate corresponding parts throughout the views.

DETAILED DESCRIPTION

Embodiments of a portable electronic device as disclosed are described in detail here with reference to the drawings.

Figure 1:
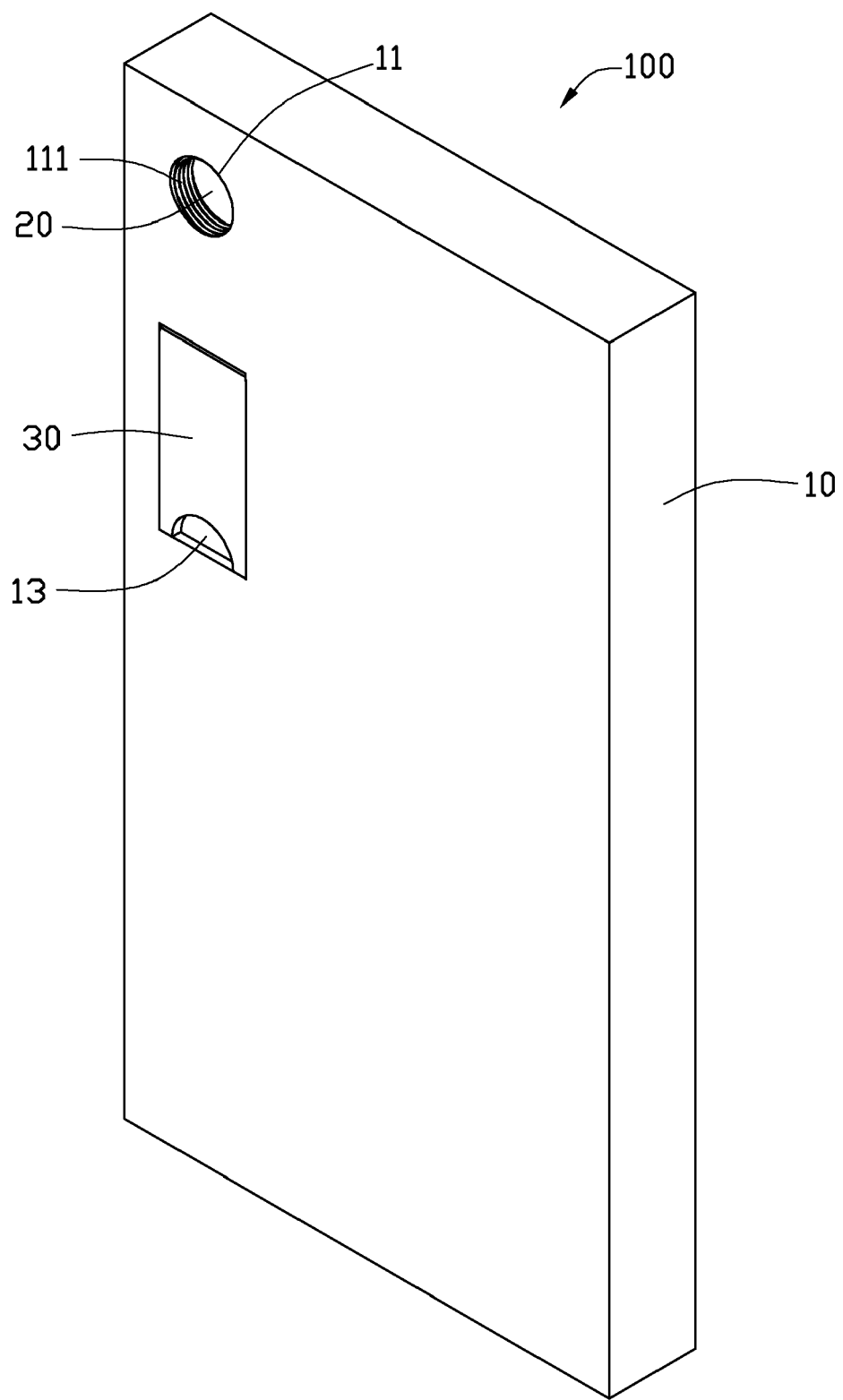
FIG. 1 is a schematic view of a portable electronic device in accordance with a first embodiment.
Figure 2:
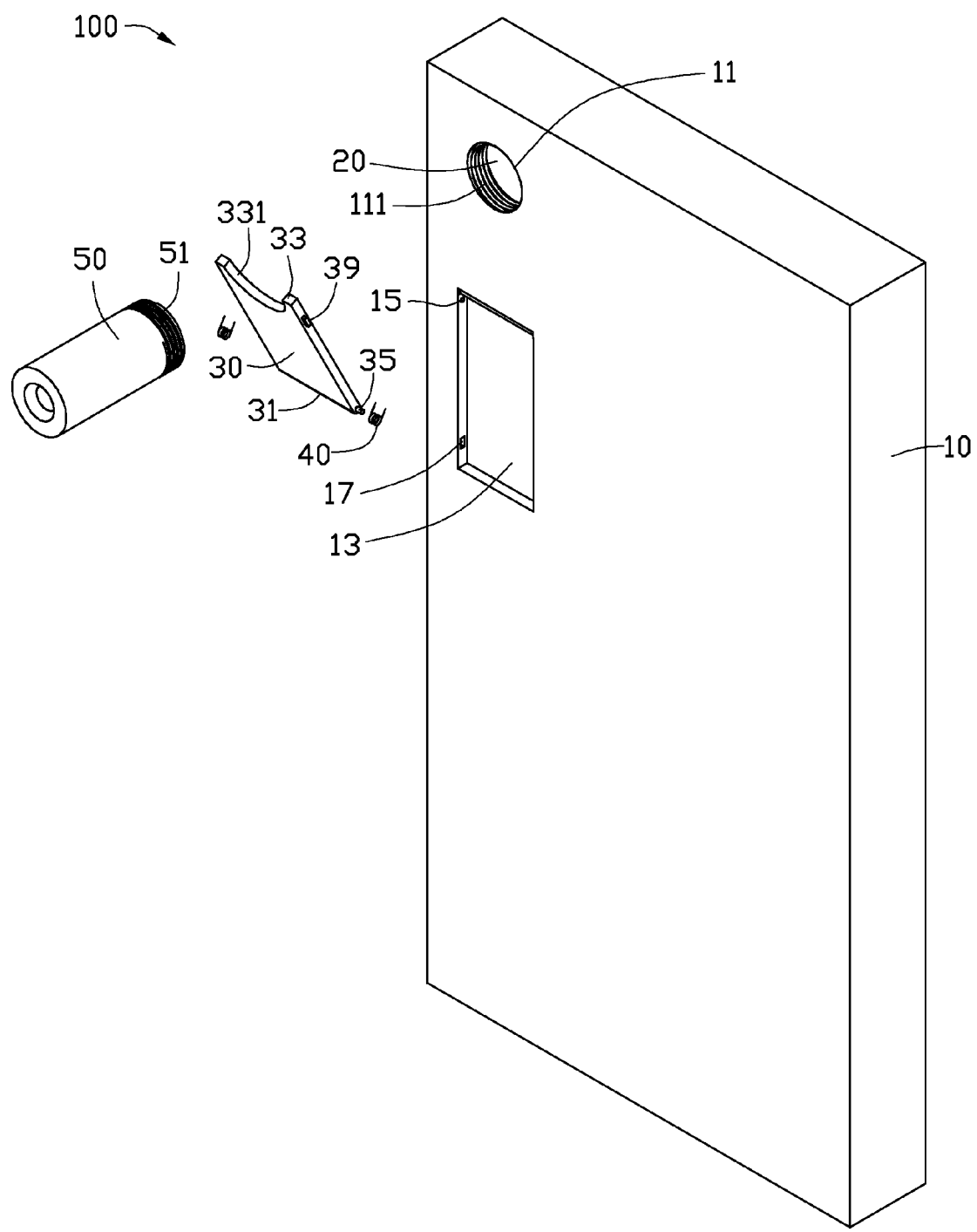
FIG. 2 is an exploded view of an external device accessory arranged at the portable electronic device of FIG. 1.
Figure 3:
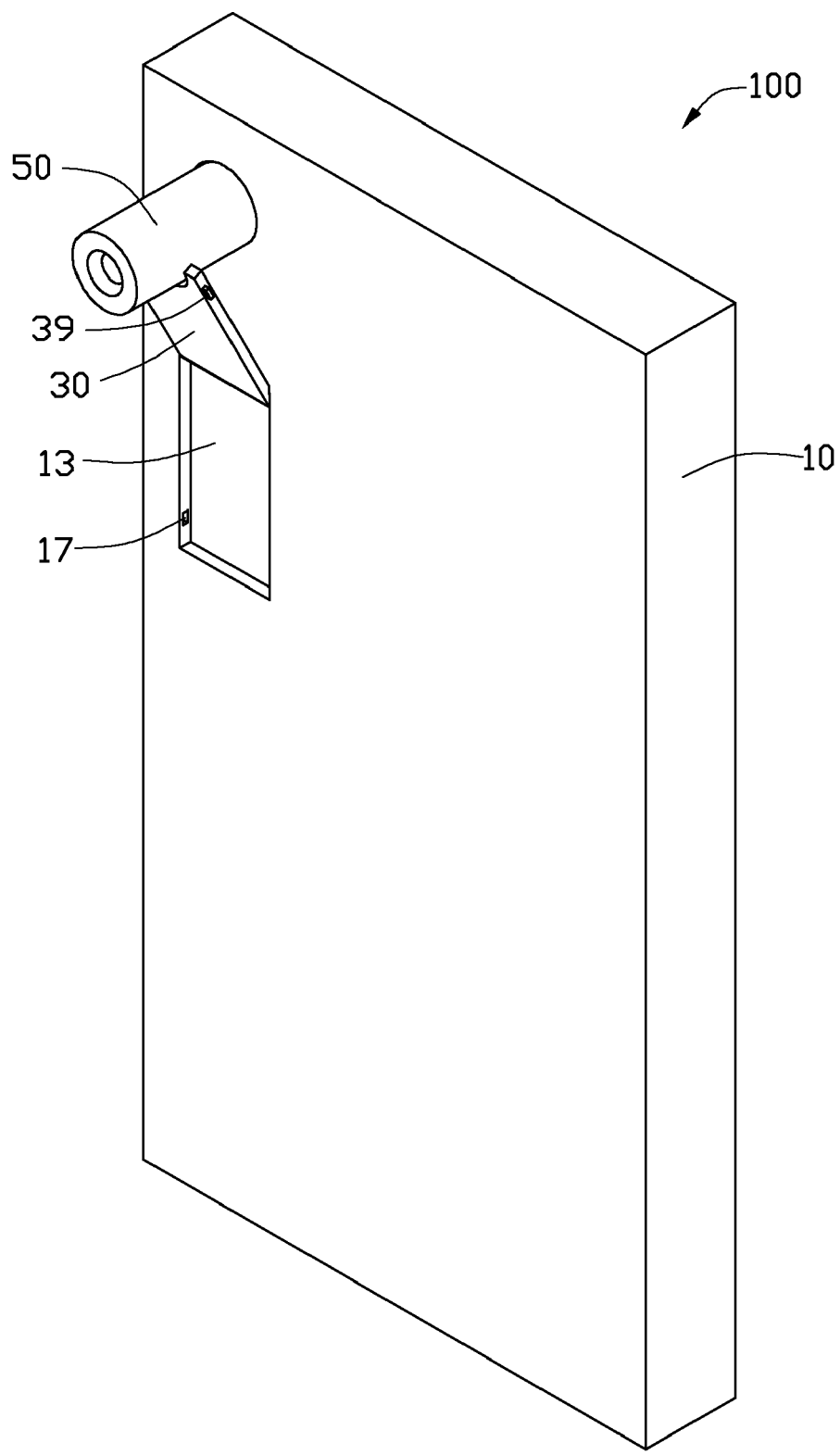
FIG. 3 is a schematic view of the portable electronic device of FIG. 1 in an operating state.

Referring to FIGS. 1 and 2, a portable electronic device 100 in accordance with a first embodiment includes a case 10, a camera lens module 20, a support 30, and two springs 40.

Referring to FIG. 2, the case 10 has a lens hole 11 and a receiving cavity 13. Light passes through the lens hole 11 to the camera lens module 20 which captures the corresponding image. In this embodiment, the case 10 is a rectangular structure for receiving elements, such as a chip, and a battery. The lens hole 11 is arranged at the back of the case 10. In this embodiment, the lens hole 11 is near a corner of the case 10. The inside wall of the lens hole 11 has a first connection portion 111. The first connection portion 111 receives a second connection portion 51 of an external device accessory 50. Thus, the external device accessory 50 is fixed at the case 10. The external device accessory 50 and the camera lens module 20 are matched mutually. Moreover, the external device accessory 50 can be a lens shield, wide-angle lens, or other lens type.

In this embodiment, the first connection portion 111 is an internal thread. The second connection portion 51 of the external device accessory 50 is an external thread. The external device accessory 50 is fixed on the case 10 by the internal and external threads. The first connection portion 111 and the second connection portion 51 are not limited to this embodiment, and can, alternatively, respectively be a slot, and flange corresponding to the slot, or other arrangements. The external device accessory 50 is fixed on the case 10 by the first connection portion 111 and the second connection portion 51.

The case 10 can be metal, stainless steel, or plastic material.

The camera lens module 20 is arranged inside the case 10 corresponding to the lens hole 11. The camera lens module 20 electrically connects to the components inside the case 10. Thus, the portable electronic device 100 provides an image capture function.

Preferably, the optical axis of the camera lens module 20 is coaxial with a center axis of the lens hole 11, preventing the camera lens module 20 of the case 10 from shifting from the lens hole 11 and affecting image quality.

Preferably, the camera lens module 20 comprises a Charge Coupled Device (CCD) image sensor, or a Complementary Metal-Oxide-Semiconductor Transistor (CMOS) image sensor.

The receiving cavity 13 of the case 10 receives the support 30. In this embodiment, the receiving cavity 13 along the radial direction of the lens hole 11 is arranged near and below the lens hole 11. The inside wall of the receiving cavity 13 near one end of the lens hole 11 has an axle hole 15. The support 30 connects with the case 10 by the axle hole 15. The receiving cavity 13 is arranged below the lens hole 11.

The support 30 supports the external device accessory 50 fixed on the case 10. The support 30 pivots on the case 10 and is located at the periphery of the lens hole 11. In this embodiment, the support 30 is a rectangular sheet connecting to the case 10 and is received in the receiving cavity 13 below the lens hole 11. The support 30 has a pivot point 31, and a supporting end 33. The supporting end 33 is located at a top side of the support 30 opposite to a bottom side of the support 30 where the pivot point 31 is located. The pivot point 31 has a pivot 35. The pivot 35 and the axle hole 15 of the receiving cavity 13 are matched mutually. Thus, the support 30 connects to the case 10. By the pivot 35, the support 30 rotates around the pivot 35 relative to the case 10.

The support 30 is received in the receiving cavity 13, maintaining surface integrity of the portable electronic device 100.

The supporting end 33 of the support 30 has a matching portion 331. The matching portion 331 and a part of the external device accessory 50 are matched mutually. In this embodiment, the external device accessory 50 is a circular structure. The matching portion 331 is a curved indentation. A part of the external device accessory 50 is received in the matching portion 331. Thus, the external device accessory 50 does not incline due to the size and weight.

The setting method of the support 30 is not limited to this embodiment.

Preferably, the length of the support 30 exceeds the shortest distance between the lens hole 11 and the pivot 35. In this embodiment, the shortest distance between the lens hole 11 and the pivot 35 is the shortest distance between the edge closest to the pivot 35 of the lens hole 11 and the pivot 35, ensuring the support 30 can support the external device accessory 50 of the case 10 effectively.

Two springs 40 are respectively disposed on the two ends of the pivot 35. In this embodiment, one end of the spring 40 connects to the pivot 35, and the other end connects to the axle hole 15. Tension from the spring 40 produces a rotating force impelling the support 30 toward one side of the lens hole 11, ensuring the support 30 supports the external device accessory 50.

Preferably, each spring 40 is a torsion spring providing reverse force.

Furthermore, the sidewall of the supporting end 33 of the support 30 and the sidewall of the receiving cavity 13 have a fastener. Thus, the support 30 is received in the receiving cavity 13. In this embodiment, the sidewall of the supporting end 33 of the support 33 has a flange 39. The sidewall of the receiving cavity 13 has a slot 17 corresponding to the flange 39. The flange 39 is received in the slot 17. Thus, the support 30 and the receiving cavity 13 can seal mutually. When not in use, the support 30 is received in the receiving cavity 13. The support 30 and the fastener of the receiving cavity 13 are not limited to this embodiment.

In use, only the supporting end 33 of the support 30 needs be removed from the receiving cavity 13.

When assembling the external device accessory 50 on the portable electronic device 100, the second connection portion 51 of the external device accessory 50 aligns with the first connection portion 111 of the lens hole 11. Then, the second connection portion 51 is received in the lens hole 11. Thus, the external device accessory 50 is fixed at the case 10 of the portable electronic device 100.

Preferably, the center axis of the external device accessory 50 of the case 10 is coaxial with the optical axis of the camera lens module 20, ensuring the external device accessory 50 and the camera lens module 20 match effectively.

When the radial length of the external device accessory 50 is larger, user can utilize support 30 to support the external device accessory 50. Thus, that ensures the center axis of the external device accessory 50 and the optical axis of the camera lens module 20 being coaxial mutually.

The portable electronic device 100 can be mobile phone, PDA, or MP3 player. The portable electronic device 100 can replace the case 10. Thus, the different case 10 can have different internal fasteners corresponding to different external device accessories 50.

While here the external device accessory 50 can be a lens shield, wide-angle lens, or other lens type, the disclosure is equally applicable with the external device accessory comprising a microphone, IR transmitter, or other device accessory, in which case the accessory connects to an accordingly configured utility housed within the electronic device While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
 a case having a lens hole, the lens hole having a first connection portion that is engaged with a second connection portion of an external device accessory, the first connection portion being an internal thread, and the second connection portion of the external device accessory being an external thread corresponding to the internal thread;
 a camera lens module arranged in the case and corresponding to the lens hole, the optical axis of the camera lens module being coaxial with a center axis of the lens hole and a center axis of the external device accessory; and
 a support holding the external device accessory, wherein the support connects to the case by a pivot.

2. The portable electronic device of claim 1, wherein the case further includes a receiving cavity for receiving the support, the receiving cavity near one end of the lens hole has an axle hole corresponding to the pivot, and the support connects to the case by the pivot and the axle hole.

3. The portable electronic device of claim 2, further comprising two springs respectively provided on the two ends of the pivot.

4. The portable electronic device of claim 3, wherein the support is received in the receiving cavity by a fastener.

5. The portable electronic device of claim 1, wherein the length of the support exceeds the shortest distance between the lens hole and the pivot.

6. The portable electronic device of claim 5, wherein the supporting end of the support has a matching portion engaged with the shape of the external device accessory.

7. A portable electronic device, comprising:
 a case having a lens hole, the lens hole having a first connection portion that is engaged with a second connection portion of an external device accessory;
 a camera lens module arranged in the case and corresponding to the lens hole; and
 a support holding the external device accessory and being connected to the case by a pivot.

8. The portable electronic device of claim 7, wherein the optical axis of the camera lens module is coaxial with a center axis of the lens hole and a center axis of the external device accessory.

9. The portable electronic device of claim 7, wherein the first connection portion is an internal thread, and the second connection portion of the external device accessory is an external thread corresponding to the internal thread.

10. The portable electronic device of claim 7, wherein the length of the support exceeds the shortest distance between the lens hole and the pivot.

11. The portable electronic device of claim 7, wherein the supporting end of the support has a matching portion engaged with the shape of the external device accessory.

12. An electronic device, comprising:
 a case comprising a lens hole, the lens hole being configured for the case to be removably engaged with an external device accessory at the lens hole;
 a camera lens module arranged in the case, the camera lens module being disposed corresponding to the lens hole; and
 a support for holding the external device accessory, the support being engaged with the case by a pivot.

13. The electronic device of claim 12, wherein the optical axis of the camera lens module is coaxial with a center axis of the lens hole and a center axis of the external device accessory.

14. The electronic device of claim 12, wherein the lens hole comprises a first connection portion that is engaged with a second connection portion of the external device accessory.

15. The electronic device of claim 14, wherein the first connection portion of the lens hole is an internal thread, and the second connection portion of the external device accessory is an external thread corresponding to the internal thread.

16. The electronic device of claim 12, wherein the case further comprises a receiving cavity for receiving the support.

17. The electronic device of claim 16, wherein an axle hole is formed at an end of the receiving cavity adjacent to the lens hole, and the axle hole is configured for receiving the pivot.

18. The electronic device of claim 17, further comprising a pair of springs respectively provided on two opposite ends of the pivot.

19. The electronic device of claim 12, wherein the support is received in the receiving cavity by at least one fastener.

20. The electronic device of claim 12, wherein the case is a case of a mobile phone, a personal digital assistant (PDA), or an MP3 player.

* * * * *